United States Patent [19]

Torma et al.

[11] Patent Number: 5,201,408
[45] Date of Patent: * Apr. 13, 1993

[54] HOUSING FOR ELECTRIC SWITCHES

[75] Inventors: Mikael Torma, Schweiz; Hansjörg Portmann, Gerlafingen, both of Switzerland

[73] Assignee: Elektro-Apparatebau Olten AG, Olten, Switzerland

[*] Notice: The portion of the term of this patent subsequent to Mar. 24, 2009 has been disclaimed.

[21] Appl. No.: 748,741

[22] Filed: Aug. 21, 1991

Related U.S. Application Data

[62] Division of Ser. No. 530,653, May 30, 1990, Pat. No. 5,099,094.

[30] Foreign Application Priority Data

Jun. 12, 1989 [CH] Switzerland .......................... 2186/89

[51] Int. Cl.⁵ .......................... H01H 9/02; H01H 9/00
[52] U.S. Cl. .................................. 200/294; 200/292; 200/314; 200/520
[58] Field of Search ............... 200/294, 292, 314, 315, 200/296, 520

[56] References Cited

U.S. PATENT DOCUMENTS

| | | | |
|---|---|---|---|
| 1,248,384 | 11/1917 | Newton et al. | 200/294 |
| 4,590,342 | 5/1986 | Schlegel | 200/341 |
| 5,077,454 | 12/1991 | Lorenzo | 200/296 |
| 5,099,094 | 3/1992 | Torma et al. | 200/296 |

Primary Examiner—Henry J. Recla
Assistant Examiner—David J. Walczak
Attorney, Agent, or Firm—Peter K. Kontler

[57] ABSTRACT

The housing for an electric snap action switch has a front section with a frame having a surface serving to abut the front side of a mounting plate, and a coaxial rear section with a surface facing away from the surface of the frame and serving to abut or to be placed adjacent one side of a circuit board. A nut mates with an externally threaded tubular portion of the front section to maintain the surface of the frame in abutment with the mounting plate. The two sections are separably coupled to each other by resilient male detent elements which are provided on the front section and extend into complementary female detent elements of the rear section. The housing acts as a distancing element between the mounting plate and the circuit board, and its rear section has a recess for a switching unit which is secured to the circuit board and can be actuated by movable parts which are installed in the front section. The rear section is secured to the circuit board by screws.

8 Claims, 2 Drawing Sheets

HOUSING FOR ELECTRIC SWITCHES

CROSS-REFERENCE TO RELATED CASE

This is a division of commonly owned copending patent application Ser. No. 07/530,653 filed May 30, 1990 for "Housing for electric switches", now U.S. Pat. No. 5,099,094, granted Mar. 24, 1992.

The switch housing of the present invention is identical with the switch housing which is disclosed in the commonly owned copending patent application Ser. No. 07/530,654, filed May 30, 1990, now U.S. Pat. No. 5,099,094 for "Electric switch".

BACKGROUND OF THE INVENTION

The invention relates to electric switches in general, and more particularly to improvements in housings for electric switches, e.g., snap action switches which are carried by a mounting plate and include switching units which are connected with a circuit board.

Various signal transmitting, signal displaying, signal processing and other modules which are connected to or are incorporated into a circuit board are often controlled by electric switches which are carried by a mounting plate. The mounting plate can constitute an electrical switchboard or panel, an electrical control panel or part of a switchboard gallery. Portions of the switches normally extend a predetermined distance from the front side of the mounting plate so as to be reachable by hand or otherwise for actuation of the selected switch or switches. Those portions of the switches which are located behind the mounting plate occupy a certain amount of space and, if such portions are connected to a circuit board, the latter must be disposed at a predetermined distance from the mounting plate. At the present time, proper spacing of the mounting plate from the circuit board is ensured by resorting to distancing elements in the form of bolts or the like. The application of discrete distancing elements, in addition to installation of the switches, is a time-consuming operation. Moreover, if the distancing elements are too short or too long or are deformed subsequent to their application, the distance of the circuit board from the mounting plate departs from an optimum distance which can adversely affect the actuation of switches. For example, the actuating parts in one of the switches will then cover a first distance in order to actuate the switching unit of the respective switch, and the actuating parts in another switch housing will cover a different (greater or lesser) second distance in order to effect actuation of the corresponding switching unit.

OBJECTS OF THE INVENTION

An object of the invention is to provide a novel and improved switch housing which, in addition to its function of confining and/or carrying the switching unit and the actuating means for the switching unit, can also perform one or more additional desirable functions.

Another object of the invention is to provide novel and improved means for maintaining a circuit board at an optimum distance from a plate or a like support for a plurality of switch housings.

A further object of the invention is to provide a housing which can be used in lieu of standard distancing elements between two spaced apart components, such as a mounting plate and a circuit board.

An additional object of the invention is to provide a housing which can be repeatedly assembled and taken apart in a simple and time-saving manner without the need for any tools or by resorting to readily available elementary tools.

Still another object of the invention is to provide novel and improved means for coupling separable sections or components of the above outlined housing to each other.

A further object of the invention is to provide novel and improved means for holding the housing in an optimum position with reference to a support, such as a mounting plate.

SUMMARY OF THE INVENTION

The invention is embodied in a housing for an electric switch, such as a snap action switch. The improved housing comprises a front section and a rear section which is or can be coaxial with the front section, and the front section has a first surface (preferably a flat surface) facing toward the rear section and serving to be placed adjacent (e.g., into actual abutment with) one side of a switch mounting plate. The rear section has a second surface which faces away from the first surface and serves to be positioned adjacent (e.g., into actual contact with) a circuit board. The housing further comprises means for holding the first surface at a predetermined distance from the one side of the mounting plate. The second surface is or can be parallel to the first surface.

The front section is preferably separable from the rear section, i.e., the first and second surfaces can be separated, and the housing further comprises means (e.g., a form-locking or a force-locking connection) for separably coupling the front and rear sections to each other. The coupling means can comprise projections which are provided on one of the sections and extend into the other section. Such projections can be provided on the front section and can be dimensioned to extend through the rear section and beyond the second surface. Those portions of the projections which extend beyond the second surface can be provided with coplanar end faces each of which is disposed at the same distance from the first surface in assembled condition of the housing. For example, the projections can include preferably resilient male detent elements which are provided on the front section and are removably received in complementary female detent elements of the rear section.

The rear section can be provided with a recess for a switching unit; such recess preferably extends from the second surface in a direction toward the front section. The rear section preferably constitutes or comprises a flange which surrounds at least a portion of the recess.

The front section of the housing can include a frame, and the first surface is then provided on the frame. Furthermore, the front section can comprise a tubular portion which is preferably integral with the frame and extends from the first surface toward the rear section. The aforementioned holding means can comprise an external thread on the tubular portion of the first section and a nut having an internal thread serving to mate with the external thread at the other side of the mounting plate.

The novel features which are considered as characteristic of the invention are set forth in particular in the appended claims. The improved electric switch housing itself, however, both as to its construction and its mode of operation, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
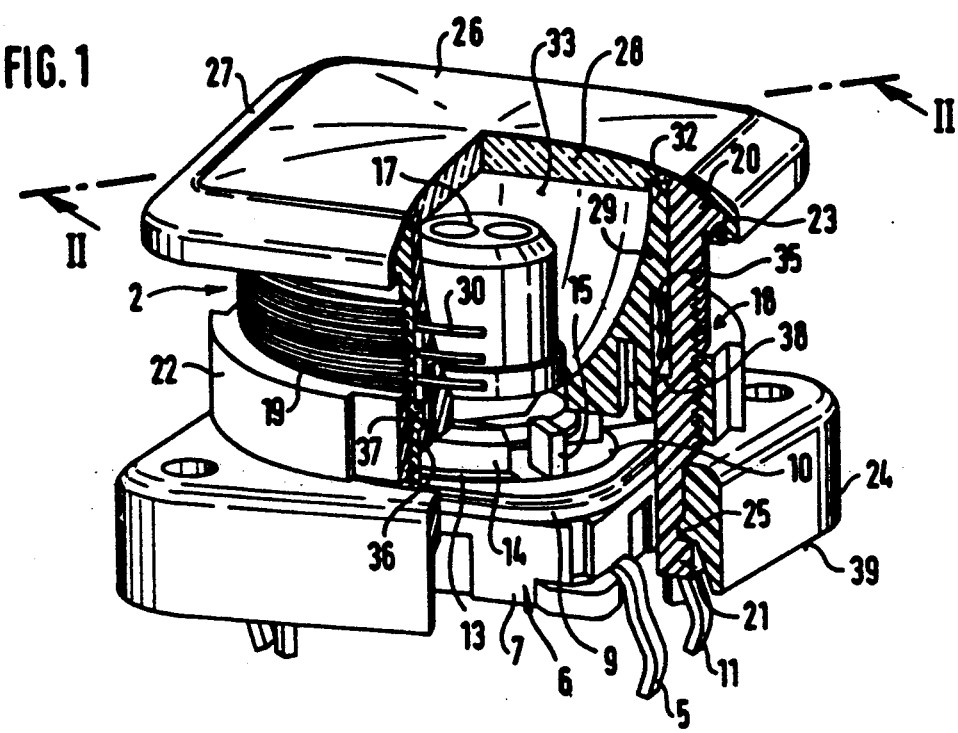
FIG. 1 is a perspective view of an electric switch with a housing which embodies one form of the invention, a portion of the housing being broken away.
Figure 2:
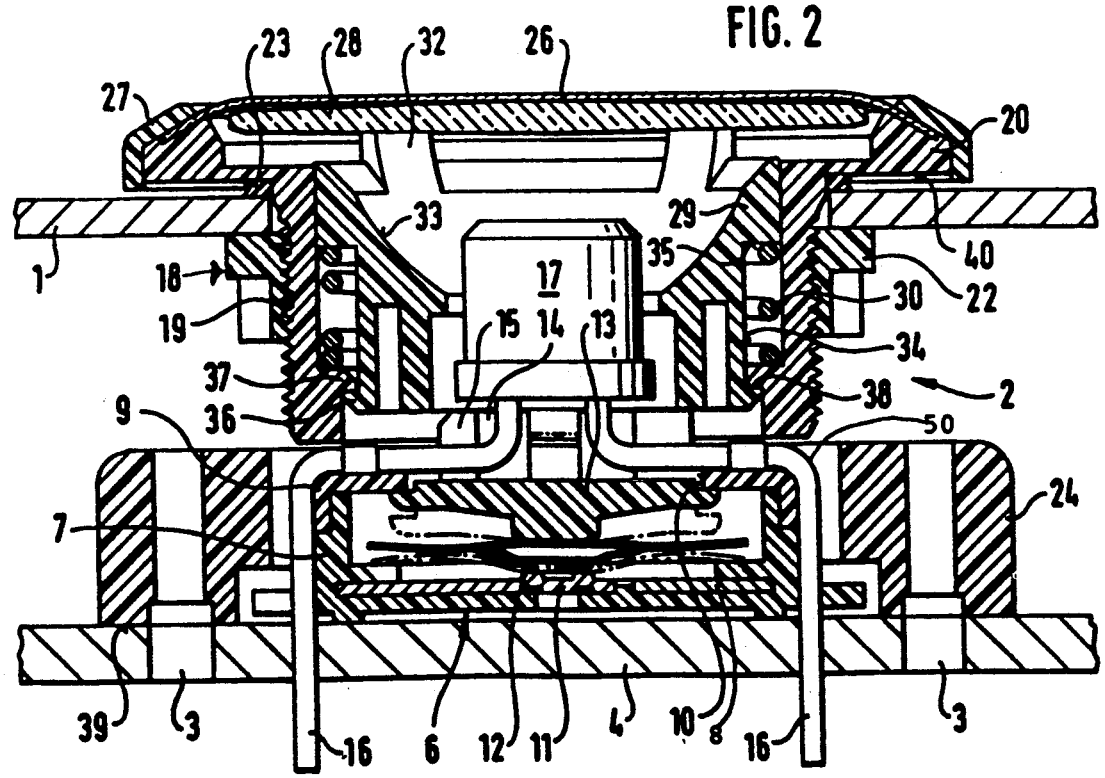
FIG. 2 is a central sectional view substantially as seen in the direction of arrows from the line II—II of FIG. 1.

FIG. 2 shows an electric switch which includes a novel housing 2 having a first or front section 18 with a flat surface 40 abutting the outer side of a mounting plate 1, and a second or rear section 24 with a second surface 39 abutting the front or inner side of a circuit board 4. The mounting plate 1 has an opening through which the front section 18 of the housing 2 extends toward the circuit board 4. The means for securing the rear section 24 of the housing 2 to the circuit board 4 comprises two or more threaded fasteners 3. The purpose of the illustrated switch is to connect or disconnect the contacts 5, 11 of a switching unit 6 with or from selected conductor means on the circuit board 4.

Figure 3:
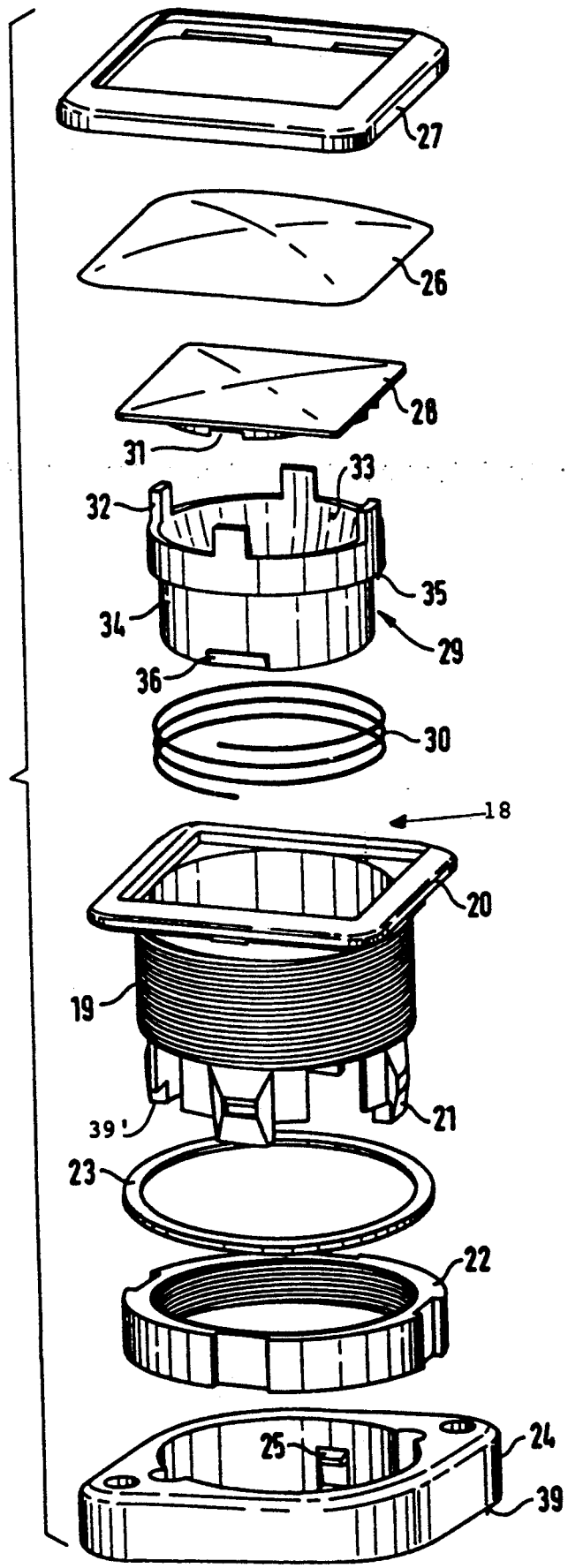
FIG. 3 is an exploded perspective view of the housing, of the actuating means and of the holding means.

The switching unit 6 is installed in a recess 50 of the housing 2 in such a way that it is surrounded by the rear section 24. The latter resembles or constitutes a flat annular flange (see particularly FIG. 3) and its surface 39 is or can be substantially or exactly parallel to the surface 40 which abuts or is held at a predetermined distance from the mounting plate 1. The switching unit 6 comprises the aforementioned contacts 5, 11 and a casing 7 which has a substantially square outline and includes a bottom end wall 8. The casing 7 is connected with a frame 9 having an opening 10 which is adjacent a tubular portion 19 of the front section 18. The contacts 5 and 11 are installed in the bottom end wall 8 and are electrically connected with two conductors on the circuit board 4. The bottom end wall 8 is further connected with a membrane-like contact 12 which can snap between an operative and an inoperative position in a manner as disclosed, for example, in our copending patent application Ser. No. 07/530,672 filed May 30, 1990 for "Snap action switch and contact therefor". The idle or inoperative position of the contact 12 is shown in FIG. 2 by solid lines. When this contact is deformed by actuating means in the housing 2, it assumes the broken-line operative position of FIG. 2 in which it establishes or interrupts an electrical connection between the contact 11 and one or more conductors on the circuit board 4. The means for deforming the contact 12 includes a dished plate-like member 13 which is biased by the resilient contact 12 so that it normally abuts the frame 9 on the casing 7 of the switching unit 6. A rib-like protuberance 14 projects beyond the member 13 in a direction toward the mounting plate 1 and is provided with radial passages 15 for conductors 16 forming part of a radiation source 17. The conductors 16 extend through openings in the bottom end wall 8 and through openings in the circuit board 4 and are connected with conductors on the circuit board so that the radiation source 17 can light up (emit radiation) in response to actuation or deactivation of the switching unit 6.

The switching unit 6 is a self-sustaining structure which can be secured to a selected portion of the circuit board 4 to have its contacts 5, 11 connected or connectable with selected conductors on the board 4. As a rule, the latter is connected with a number of switches each of which includes a housing 2, a switching unit 6 and a radiation source 17. In order to actuate the switching unit 6, it is necessary to depress the protuberance 14 so that the member 13 is moved against the opposition of and deforms the membrane-like contact 12 in the casing 7. To this end, the member 13 includes a projection which can deform a centrally located web of the contact 12 in response to depression of the protuberance 14. The web of the contact 12 is thereby caused to snap through and beyond a dead-center position and to assume the broken-line position of FIG. 2 in which it engages the contact 11. If the pressure upon the protuberance 14 is relaxed or terminated, the innate resiliency of the contact 12 enables the latter to move the member 13 back against the frame 9 on the casing 7, i.e., the contact 12 reassumes the solid-line inoperative position of FIG. 2 in which its web does not engage the contact 11. The just described procedure of stressing and relaxing the stress upon the contact 12 can be resorted to for the purpose of testing the switching unit 6 and the circuit board 4 prior to attachment of the switch housing 2 to the mounting plate 1.

The front section 18 of the housing 2 comprises the aforementioned tubular portion 19 which has an external thread forming part of a means for holding the surface 40 in abutment with or at a predetermined distance from the front side of the mounting plate 1. Such holding means further comprises a nut 22 having an internal thread which mates with the external thread of the tubular portion 19. The front section 18 further comprises a frame 20 which is located in front of the mounting plate 1 and is integral with the front end of the tubular portion 19. The rear end of the tubular portion 19 has several resilient projections 21 each of which can be said to constitute a male detent element extending into a complementary female detent element 25 of the rear section 24. Such male and female detent elements 21, 25 constitute a coupling which serves to separably connect the front and rear sections 18, 24 of the improved housing 2 to each other. The illustrated coupling is designed to establish a form-locking connection between the sections 18 and 24; however, it is equally possible to employ a coupling which is designed to establish a force-locking connection.

The surface 40 is provided on the frame 20 and determines the extent to which the projections 21 of tubular portion 19 of the front section 18 extend beyond the inner side of the mounting plate 1. As mentioned above, the nut 22 cooperates with the external thread of the tubular portion 19 to constitute a means for holding the surface 40 in abutment with or at a predetermined distance from the exposed side of the mounting plate 1. A sealing washer 23 is installed between the rear side of the mounting plate 1 and the nut 22.

When the attachment of the frame 20 and tubular portion 19 of the front section 18 to the mounting plate 1 (by way of the nut 22) is completed, the flange 24 is coupled to the front section 18 in that its female detent elements 25 receive the resilient projections 21 at the rear end of the tubular portion 19.

The means for actuating the unit 6 (by depressing the protuberance 14 in order to enable the member 13 to deform the contact 12) comprises an elastically deformable foil 26 which overlies the outer side of the frame 20 and the marginal portions of which are or can be permanently secured to the frame, e.g., by welding or by means of a suitable adhesive. The marginal portions of the foil 26 are concealed by a frame 27 which is affixed to the frame 20 of the front section 18. The frame 27 is preferably detachable and can be replaced with a differently colored and/or configurated frame so that the color and/or the configuration of the frame 27 facilitates rapid identification or selection of the switch if the switch is one of a number of similar or identical switches on the mounting plate 1.

The means for actuating the switching unit 6 further comprises a radiation diffusing and transmitting panel 28 which is inwardly adjacent the elastically deformable foil 26, and a reflector 29 which is interposed between the panel 28 and the unit 6 and is reciprocable in the tubular portion 19. The means for biasing the reflector 29 against the radiation transmitting panel 28 comprises a coil spring 30 which bears against an external shoulder 35 of the reflector 29 and reacts against an internal surface or shoulder 38 of the tubular portion 19 in assembled condition of the switch.

The panel 28 can be furnished in any one of a number of different colors and serves to transmit radiation which is emitted by the source 17 in a direction toward and into the front section 18 of the housing 2. Each of the four sides of the rectangular or square panel 28 is provided with a cutout or notch 31 for reception of one of four projections or studs 32 at the adjacent front end of the reflector 29. This reflector has a concave or otherwise configurated surface 33 serving to reflect radiation from the source 17 toward the adjacent side of the panel 28. The surface 33 surrounds the radiation source 17. The notches 31 and the studs 32 are optional, i.e., the panel 28 can simply abut the adjacent front end of the reflector 29 without being coupled thereto.

The threaded cylindrical external surface 34 of the reflector 29 is provided with the aforementioned shoulder 35 for the front convolution of the coil spring 30, and the rear end of this external surface is provided with two projections 36 which are located diametrically opposite each other and cooperate with complementary internal projections 37 of the tubular portion 19 to ensure that the reflector 29 is axially movably installed in but cannot accidentally leave the housing 2. The coil spring 30 reacts against the internal shoulder 38 of the tubular portion 19 and is installed in prestressed condition so that it permanently urges the reflector 29 against the panel 28, i.e., the panel 28 is permanently biased against the inner side of the foil 26. The coil spring 30 further tends to maintain the projections 36 in abutment with the respective internal projections 37 as seen in FIG. 2. This spring confines the panel 28 between the foil 26 and the reflector 29 irrespective of whether or not the panel 28 is provided with the notches 31 and the reflector 29 is provided with the studs 32.

When the installation of the front section 18 (by means of the nut 22) in the mounting plate 1 is completed, and the resilient projections 21 are already received in the complementary female detent elements 25 of the rear section 24, the surface 39 of the rear section 24 is parallel to the surface 40 and the section 24 is ready to be affixed to a selected portion of the circuit board 4 by means of the fasteners 3. Once the projections 21 are received in the respective female detent elements 25, the surface 39 is located at a predetermined distance from the surface 40, and this applies for each of two or more switches which are installed in the mounting plate 1. The surface 39 is preferably a flat surface. Since the mutual spacing of the surfaces 39 and 40 matches a preselected distance, the circuit board 4 is invariably parallel to the mounting plate 1 as soon as the plate 1 carries two or more novel housings 2 and the circuit board 4 abuts the surfaces 39 of two or more rear sections 24.

The surface 39 surrounds the aforementioned recess 50 for the switching unit 6 and the radiation source 17. The switching unit 6 and the radiation source 17 can be connected to the circuit board 4 before the latter is placed against the surface 39 of the rear section 24. This ensures that the switching unit 6 and the radiation source 17 automatically enter the recess 50 and assume optimum positions relative to the actuating means 26, 28, 29 and reflecting surface 33. The fasteners 3 can include screws which cut an internal thread into the rear section 24 during attachment of this rear section to the circuit board 4.

It is possible to select the length of the resilient projections 21 in such a way that their free ends project (e.g., through a small distance) beyond the surface 39 of the section 24 as soon as the projections 21 are properly received in the complementary female detent elements 25. The end faces or surfaces 39' of such projections then form a composite surface which replaces the surface 39 by serving as an abutment which determines the mutual spacing of the mounting plate 1 and circuit board 4. The length of all projections 21 is the same so that each end face 39' is located at the same distance from the surface 40.

Once the attachment of the circuit board 4 to the section 24 is completed, the actuating means including the parts 26, 28, 29 is ready to actuate the switching unit 6. This is due to the fact that the distance of the surface 39 or surfaces 39' from the surface 40 matches a predetermined value. Thus, all that is necessary to actuate the switching unit 6 (in order to establish or terminate an electrical connection between the contacts 11 and 12) is to apply pressure against the elastically deformable foil 26 in order to displace the panel 28 which, in turn, shifts the reflector 29 in the tubular portion 19 of the front section 18 so that the protuberance 14 is compelled to move the member 13 relative to the casing 7 in order to deform the afordiscussed web of the contact 12.

An advantage of the improved housing 2 is that it constitutes a distancing element between the plate 1 and the board 4. If the illustrated housing 2 is identical with the housing or housings of one or more additional switches which are installed between the plate 1 and the circuit board 4, the distance which the foil 26 in any one of these switches must cover in order to actuate the respective switching unit 6 is always the same. In other words, the distance of the protuberance 14 from the reflector 28 in each of two or more identical switches is the same.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A housing for housing electric switch components adapted to cooperate with a circuit board, comprising a front section and a rear section, said front section having a first surface facing toward said rear section and arranged to be placed adjacent one side of a switch mounting plate, said rear section having a second surface facing away from said first surface and arranged to be positioned adjacent said circuit board, means for separably coupling said front and rear sections to each other, said rear section including means adapted to be secured to said circuit board at least one projection being provided on said front section and extending into said rear section, said at least one projection having a portion extending beyond said second surface and adapted to engage said circuit board whereby said first surface is spaced a predetermined distance from said circuit board, and means for holding said first surface at a predetermined distance from the one side of the mounting plate.

2. The housing of claim 1, wherein said second surface is parallel to said first surface.

3. The housing of claim 1, wherein said coupling means comprises a form-locking connection between said sections.

4. The housing of claim 1, wherein said rear section has a recess for a switching unit.

5. The housing of claim 4, wherein said recess extends from said second surface toward said front section.

6. The housing of claim 4, wherein said rear section includes a flange which surrounds at least a portion of said recess.

7. The housing of claim 1, wherein said front section includes a frame and said first surface is provided on said frame, said front section further including a tubular portion extending from said first surface toward said rear section, said holding means including an external thread on said tubular portion and a nut having an internal thread arranged to mate with said external thread at the other side of the mounting plate.

8. A switching device, comprising a switch mounting plate having two sides; a circuit board; and an electric switch for said circuit board, said electric switch including a housing having a front section and a rear section, and said front section having a first surface which faces toward said rear section and is adjacent one of said sides, said rear section having a second surface which faces away from said first surface and is adjacent said board, said housing further comprising means for separably coupling said front and rear sections to each other, at least one projection being provided on said front section and extending into said rear section when said front and rear sections are coupled to each other, and said at least one projection having a portion extending beyond said second surface, said housing additionally comprising means for holding said first surface at a predetermined distance from said one side.

* * * * *